US009609568B1

(12) United States Patent
Karimli et al.

(10) Patent No.: US 9,609,568 B1
(45) Date of Patent: Mar. 28, 2017

(54) SELECTING A CHANNEL BASED ON BACKHAUL BANDWIDTH

(71) Applicant: T-Mobile USA, Inc., Bellevue, WA (US)

(72) Inventors: Yasmin Karimli, Kirkland, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/844,856

(22) Filed: Sep. 3, 2015

(51) Int. Cl.
H04W 48/16 (2009.01)
H04W 36/24 (2009.01)
H04L 12/26 (2006.01)

(52) U.S. Cl.
CPC ............. *H04W 36/24* (2013.01); *H04L 43/16* (2013.01)

(58) Field of Classification Search
CPC ..... H04W 48/16; H04W 48/18; H04W 48/20; H04W 88/06; H04W 48/12; H04W 60/00; H04W 36/14
USPC ........... 455/434, 435.1, 435.2, 436–439, 444
See application file for complete search history.

(56) References Cited

U.S. PATENT DOCUMENTS

| 2003/0185163 | A1  | 10/2003 | Bertonis et al. |          |
|--------------|-----|---------|-----------------|----------|
| 2007/0025310 | A1  | 2/2007  | Weng et al.     |          |
| 2007/0149230 | A1  | 6/2007  | Song et al.     |          |
| 2012/0039284 | A1* | 2/2012  | Barbieri ........ | H04W 48/10 |
|              |     |         |                 | 370/329  |
| 2012/0044888 | A1  | 2/2012  | Adling et al.   |          |
| 2012/0094681 | A1  | 4/2012  | Freda et al.    |          |
| 2012/0163309 | A1  | 6/2012  | Ma et al.       |          |
| 2013/0039315 | A1  | 2/2013  | Jo et al.       |          |
| 2013/0196632 | A1* | 8/2013  | Horn .......... | H04W 12/06 |
|              |     |         |                 | 455/411  |
| 2014/0044077 | A1  | 2/2014  | Chen et al.     |          |
| 2014/0087727 | A1  | 3/2014  | Walton          |          |
| 2014/0105134 | A1* | 4/2014  | Buddhikot ..... | H04W 16/14 |
|              |     |         |                 | 370/329  |
| 2014/0297822 | A1* | 10/2014 | Agrawal ....... | H04L 41/50 |
|              |     |         |                 | 709/223  |
| 2014/0329527 | A1* | 11/2014 | Choi-Grogan ... | H04W 36/0083 |
|              |     |         |                 | 455/436  |
| 2015/0009962 | A1  | 1/2015  | Clegg           |          |
| 2015/0063323 | A1  | 3/2015  | Sadek et al.    |          |

(Continued)

OTHER PUBLICATIONS

Office action for U.S. Appl. No. 14/812,520, mailed on Jun. 15, 2016, Karimli et al., "Deferential Channel Selection of Channels in Unlicensed Spectrum", 15 pages.

(Continued)

*Primary Examiner* — Cong Tran
(74) *Attorney, Agent, or Firm* — Lee & Hayes, PLLC

(57) ABSTRACT

In some implementations, a base station may determine a bandwidth associated with a backhaul connecting the base station to a network. The base station may select a band in an unlicensed spectrum based at least partly on a scan of at least a portion of the unlicensed spectrum. The base station may select an operating channel in the band based at least partly on a characteristic of the operating channel and the bandwidth associated with the backhaul. After selecting the operating channel, the base station may, based on one or more conditions, re-scan the band and select a new operating channel based at least partly on a characteristic of the new operating channel.

20 Claims, 5 Drawing Sheets

(56) References Cited

U.S. PATENT DOCUMENTS

| | | |
|---|---|---|
| 2015/0156635 A1 | 6/2015 | Liang et al. |
| 2015/0156636 A1 | 6/2015 | Tabet et al. |
| 2015/0373587 A1* | 12/2015 | Josiam .................. H04W 28/20 370/338 |
| 2016/0007273 A1 | 1/2016 | Farid et al. |
| 2016/0066204 A1* | 3/2016 | Khawer .............. H04W 72/085 455/500 |
| 2016/0165604 A1* | 6/2016 | Khawer ............ H04W 72/0453 455/452.1 |
| 2017/0034832 | 2/2017 | Karimli et al. |

OTHER PUBLICATIONS

Office action for U.S. Appl. No. 14/812,520, mailed on Dec. 2, 2016, Karimli et al., "Deferential Channel Selection of Channels in Unlicensed Spectrum", 16 pages.

PCT Search Report and Written Opinion mailed Oct. 21, 2016 for PCT application No. PCT/US2016/042599, 15 pages.

PCT Search Report and Written Opinion mailed Nov. 17, 2016 for PCT application No. PCT/US2016/047040, 14 pages.

* cited by examiner

SELECTING A CHANNEL BASED ON BACKHAUL BANDWIDTH

BACKGROUND

In a country in which a wireless carrier offers network services, the wireless carrier may operate using spectrum licensed from the country's government. However, as data traffic from mobile devices (e.g., cell phones, tablets, laptops, etc.) has increased, some governments have made unlicensed spectrum available to carriers. Unlicensed spectrum may include spectrum that carriers can use for free, e.g., without having to pay the government (or any other entity).

For example, in the United States of America (U.S.A.), the Federal Communications Commission (FCC) has made the Unlicensed National Information Infrastructure (UNIT) spectrum in the 5 Gigahertz (GHz) range, e.g., frequency bands in the range between approximately 5.15 GHz to approximately 5.825 GHz, available to wireless carriers. However, more available spectrum may result in network access equipment (e.g., cells, such as micro-cells, pico-cells, femto-cells, etc.) scanning unlicensed spectrum (e.g., UNII frequencies) in addition to scanning licensed spectrum (e.g., cellular frequencies). Scanning additional spectrum to find an operating channel may cause delays in initiating voice or data communications, resulting in customer dissatisfaction.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

The systems and techniques described herein may determine a bandwidth of a backhaul, select which band(s) to scan, scan the selected band(s) to determine a an available channel that has a channel width to support the bandwidth of the backhaul, and select the available channel. By doing so, the amount of spectrum that is scanned may be reduced, thereby reducing an amount of time taken to select a channel for communication. In this way a communication channel can be selected relatively quickly. For example, a network of a service provider may use both licensed spectrum (e.g., cellular spectrum) and unlicensed spectrum. The service provider's network may include nodes that use IEEE 802.11x. In addition, the service provider may deploy nodes that use UNII-1 and UNII-3 spectrum for Long Term Evolution-Unlicensed (LTE-U) access, also known as License Assisted Access (LAA). A node of the service provider that uses LTE-U/LAA may select a channel based on a bandwidth of the backhaul that is available to the node. By doing so, the node may be able to select an operating channel quickly, without having to scan a large number of channels.

Figure 1:
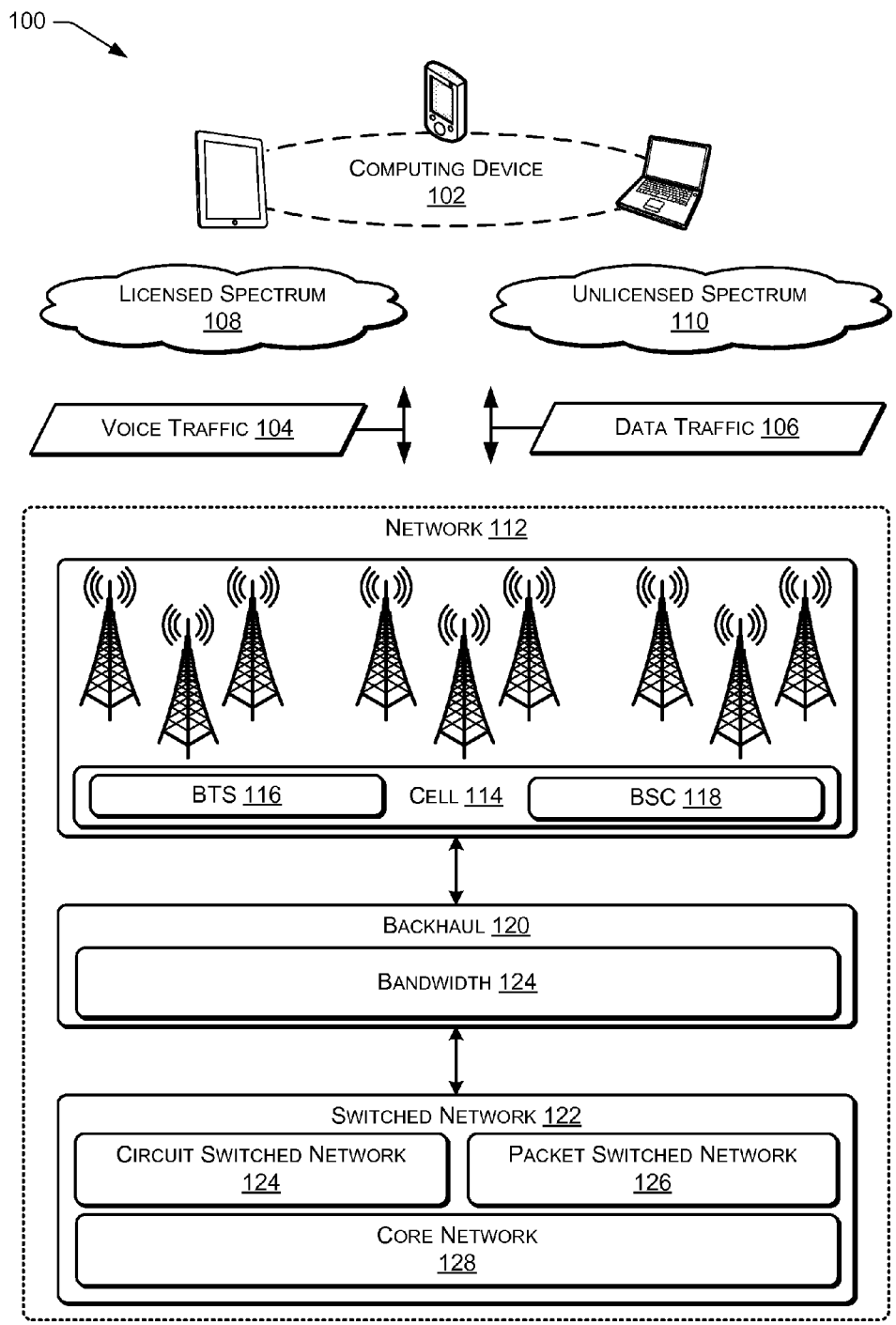
FIG. 1 is a block diagram illustrating a system that includes communications traffic over licensed and unlicensed spectrum according to some implementations.

FIG. 1 is a block diagram illustrating a system 100 that includes communications traffic over licensed and unlicensed spectrum (e.g., LTE-U/LAA in the United States) according to some implementations. The system 100 includes one or more computing devices, such as a representative computing device 102.

The computing device 102 may comprise a wireless phone, a tablet computer, a laptop computer, a wristwatch, a gaming device, or other type of computing device. The computing device 102 may include one or more processors and computer readable media, such as memory (e.g., random access memory (RAM), solid state drives (SSDs), or the like), disk drives (e.g., platter-based hard drives), another type of computer-readable media, or any combination thereof.

The computing device 102 may generate voice traffic 104, data traffic 106, or both. The traffic 104, 106 may be carried across a licensed spectrum 108, an unlicensed spectrum 110, or both (e.g., via channel aggregation). For example, in the United States, the unlicensed spectrum 110 may include the Unlicensed National Information Infrastructure (UNIT) spectrum. The licensed spectrum 108 may include spectrum that has been licensed for a fee from a government agency (e.g., the Federal Communications Commission (FCC)). The unlicensed spectrum 110 may spectrum that is made available for free for specific types of uses (e.g., Industrial, Medical, Scientific, etc.). In some cases, a government agency (e.g., the FCC) may make the unlicensed spectrum available to cellular carriers.

The frequencies of the licensed spectrum 108 may be located in the ultra-high frequency (UHF) bands and may vary based on (i) a country in which the communication is taking place and (ii) a carrier's operating frequencies in the country. For example, in the United States, the licensed spectrum 108 may include 800 megahertz (MHz), 850 MHz, 1700 MHz, 1900 MHz, 2100 MHz, other UHF frequencies, or any combination thereof. The unlicensed spectrum 110 may include UNII-1 (e.g., 5.15-5.25 gigahertz (GHz)), UNII-2 (e.g., 5.25-5.35 GHz), UNII-2e (e.g., 5.47-5.725 GHz), and UNII-3 (e.g., 5.725 to 5.825 GHz). Portions of the unlicensed spectrum 110 may be used for wireless local area network (WLAN) traffic, such as WLAN traffic that conforms to the Institute of Electrical and Electronics Engineers (IEEE) 802.11x specifications (e.g., where x=a, b, g, n, etc.).

The traffic 104, 106 may be communicated (e.g., transmitted and received) between the computing device 102 and a network 112. Multiple cells, such as a representative cell 114, may be used to transmit and receive the traffic 104, 106 between the network 112 and the computing device 102. For example, a network service provider may provide network service within a geographic area by placing cells, such as the representative cell 114, in the area such that the area is divided into approximately geometric shaped (e.g., hexagonal, square, circular or other geometric shape) coverage areas. Each cell, such as the representative cell 114, may include a base transceiver station (BTS) 116 and a base station controller (BSC) 118 to provide network coverage within a particular portion of an area.

Each cell, such as the representative cell 114, in the network 112, may use a backhaul 120 to carry traffic to and from a switched network 122. The backhaul 120 may have an associated bandwidth 124. In a telecommunications network, such as the network 112, the backhaul 120 may be used to link the switched network 122 (e.g., a backbone portion of the network 112) with cells, such as the cell 114, that are at the edge of the network 112, where the computing devices 102 access the network 112. The backhaul 120 is used to connect cells, such as the cell 114, to the switched network 122 (e.g., voice network, internet, etc.). When the cell 114 is a small cell (e.g., such as a femtocell, a picocell, a microcell, or the like), the cell 114 may be located in a relatively hard-to-access location, such as embedded in a building's infrastructure (e.g., on a wall, on a ceiling, on a side of a building, etc.). In contrast, a large cell (e.g., macro cell) may be located in a more easily accessible location, such as a rooftop or atop a cell tower. When the cell 114 comprises a small cell, the bandwidth 124 of the backhaul 120 may be less as compared to when the cell 114 comprises a large cell due to constraints, such as the location and size of the small cell. For example, a micro cell may provide a relatively small coverage area and may use a backhaul with a relatively small amount of bandwidth while a macro cell may provide a relatively large coverage area and may use a backhaul with a relatively large amount of bandwidth.

The switched network 122 may be a public switched telephone network (PSTN) or other type of switched network. The switched network 122 may include a circuit switched network 124, a packet switched network 126, and a core network 126. For each communications session, the circuit switched network 124 may temporarily establish a dedicated point-to-point connection (e.g., circuit) between two (or more) devices. The packet-switched network 126 may break a communication into small portions, e.g., packets, and send the packets based on the destination address of each packet. Each packet may not necessarily take the same route to the destination. When received at the destination, the packets are reassembled in the proper sequence to recreate the original communication. The core network 126 may provide communications paths for the exchange of information between different portions of the network, such as between the cell 114 and other cells of the network 112, between the cell 114 and other networks, etc.

The cell 114 may include a low-powered radio access node that operates in licensed spectrum (e.g., the licensed spectrum 108) and unlicensed spectrum (e.g., the unlicensed spectrum 110). The cell 114 may have a range of 10 meters to 2 kilometers or more, depending on the configuration. Depending on the physical size, the coverage area, and the configuration, the cell 114 may be a small cell, such as a femtocell, a picocell, a microcell, or the like.

When the computing device 102 is powered up in an area in which the network 112 provides coverage, the computing device 102 may search for a nearest BTS (e.g., the BTS 116) with a strongest signal in the spectrums 108, 110. The computing device 102 may identify itself to the network 112 through a control channel. Once the computing device 102 has successfully identified itself to the network 112, the computing device 102 may be referred to as "attached" to the network 112. The cell 114 may scan spectrum to identify an operating channel for the computing device to use. If the cell 114 operates in both the licensed spectrum 108 and the unlicensed spectrum 110, scanning a large amount of spectrum to identify an operating channel may be time consuming. To reduce the time to scan the licensed spectrum 108 and the unlicensed spectrum 110, the cell 114 may determine the bandwidth 124 of the backhaul 120 and scan a band in either the licensed spectrum 108 or the unlicensed spectrum 110 to identify a channel that is capable of supporting the bandwidth 124. In other words, the channel may be selected based on the bandwidth 124 of the backhaul 120. Thus, the cell 114 may scan to identify a band that can support the available bandwidth 124 of the backhaul 120 rather than scanning to identify a band with a largest available bandwidth. Therefore, for a small cell that has a backhaul with a relatively small bandwidth, the scan may be performed quickly, without having to scan a large number of channels.

In this way, by determining the bandwidth 124 and scanning to identify a channel that can support the bandwidth 124, the amount of time the cell 114 takes to scan a large amount of spectrum may be reduced, enabling the cell 114 to setup a communication channel for the computing device 102 faster and more efficiently, thereby improving the experiences of users (e.g., subscribers).

Figure 2:
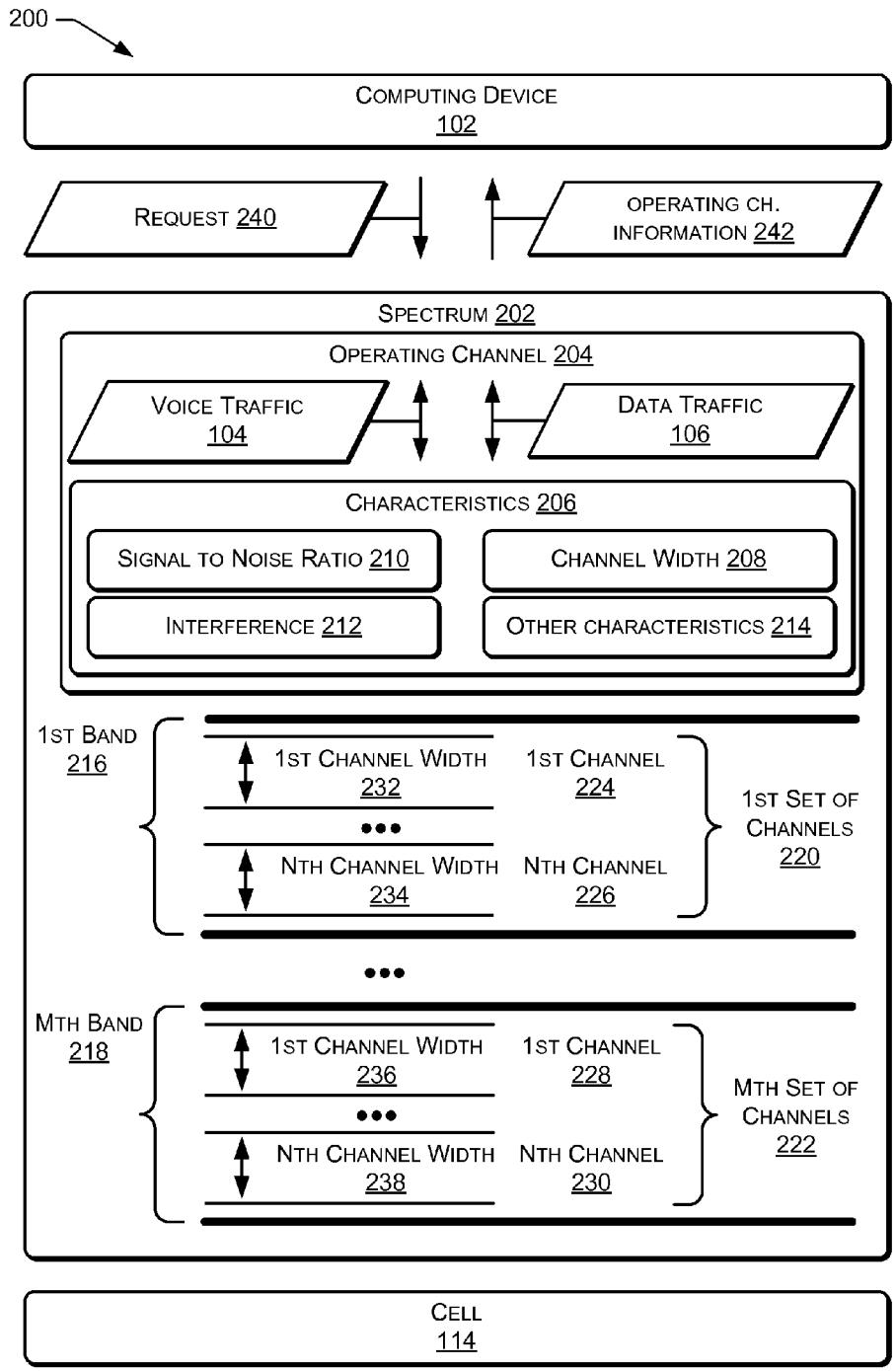
FIG. 2 is a block diagram illustrating a spectrum that includes an operating channel according to some implementations.

FIG. 2 is a block diagram illustrating a system 200 that includes an operating channel according to some implementations. A spectrum 202 may include one or more of an unlicensed spectrum (e.g., the unlicensed spectrum 110 of FIG. 1), a licensed spectrum (e.g., the licensed spectrum 108), or both. The cell 114 may select an operating channel 204 in the spectrum 202 for each device (e.g., the computing device 102) that requests to communicate via the network 112. The operating channel 204 may carry the voice traffic 104 (e.g., voice over internet protocol (VoIP) traffic), the data traffic 106, or both. Certain types of traffic, such as the voice traffic 104, that specify a particular level of service (e.g., low latency), may be carried primarily over the licensed spectrum 108, while other types of traffic (e.g., the data traffic 110) that do not specify a particular level of service (or the level of service that is specified is satisfied by the unlicensed spectrum), may be carried primarily over the unlicensed spectrum 108.

The operating channel 204 may have one or more characteristics 206. For example, the characteristics 206 may include a channel width 208, a signal to noise ratio (SNR) 210, an amount of interference 212, and other characteristics 214. The channel width 208 may identify an amount of traffic (e.g., bits) that can be transferred in each transfer operation. Thus, a data transfer rate of the operating channel 204 may be determined by multiplying the channel width 208 (e.g., bits/transfer) with a transfer rate (e.g., transfers/second) to determine the number of bits transferred per second. The SNR 210 is a ratio of an amount of a signal (e.g., relevant data) relative to an amount of noise (e.g., irrelevant data) in the operating channel 204. The interference 212 indicates an amount of disruption caused by signals in other channels to the operating channel 204, such as crosstalk, in which signals from channels adjacent to or near the operating channel 204 impinge (e.g., leak) into the operating channel 204. The other characteristics 214 may include characteristics associated with the operating channel 204, such as a data transfer rate of the operating channel 204, etc.

The operating channel 204 may be selected from multiple channels in the spectrum 202 based on one or more of the characteristics 206. For example, the operating channel 204 may be selected based on the channel width 208, the SNR 210, the interference 212, the other characteristics 214, or any combination thereof.

The spectrum 202 may include multiple frequency bands, such as a first band 216 to an Mth band 218 (where M>1). Each of the bands 216 to 218 may include a set of channels. For example, the first band 216 may include a first set of channels 220 and the Mth band 218 may include an Mth set of channels 222. Each of the set of channels 220, 222 may include one or more channels. For example, the first set of channels 220 may include a first channel 224 to an Nth channel 226 (where N>1, N not necessarily equal to M). The Mth set of channels 222 may include a first channel 228 to an Nth channel 230.

Each of the channels 224 to 226 and 228 to 230 may have a corresponding channel width. For example, in the first band 216, the first channel 224 may have a corresponding first channel width 232 and the Nth channel 226 may have a corresponding Nth channel width 234. In the Mth band 218, the first channel 228 may have a corresponding first channel width 236 and the Nth channel 230 may have a corresponding Nth channel width 238.

The cell 114 may receive a request 240 for an operating channel from the computing device 102. The cell 114 may scan bands in at least a portion of the spectrum 202 (e.g., unlicensed spectrum, licensed spectrum, or both), determine the characteristics 206 for each channel, and select the operating channel 204 based on one or more of the characteristics 206. For example, the cell 114 may scan the first set of channels 220 to determine a characteristic (e.g., the channel widths 232 to 234) and scan the Pth set of channels 220 to determine a characteristic (e.g., the channel widths 232 to 234). The cell 114 may select the operating channel 204 based on one of the characteristics 206, such as the channel width 208. The cell 114 may provide operating channel information 242 to the computing device 102 to enable the computing device 102 to use the operating channel 204.

Thus, a cell may receive a request from a computing device to select an operating channel. The cell may scan channels in unlicensed spectrum, in licensed spectrum, or in both. During the scan, the cell may determine one or more characteristics (e.g., channel width, signal to noise ratio, an amount of interference, or the like) of each channel. The cell may select the operating channel based on at least one of the one or more characteristics. After selecting the operating channel, the cell may continue to monitor characteristics of the operating channel. If one or more conditions are satisfied, the cell may re-scan and select a new (e.g., different) operating frequency. For example, the cell may re-scan after a predetermined period of time has elapsed. As another example, the cell may re-scan if the signal to noise ratio falls below a predetermined threshold. As yet another example, the cell may re-scan if the interference increases above a predetermined threshold.

Figure 3:
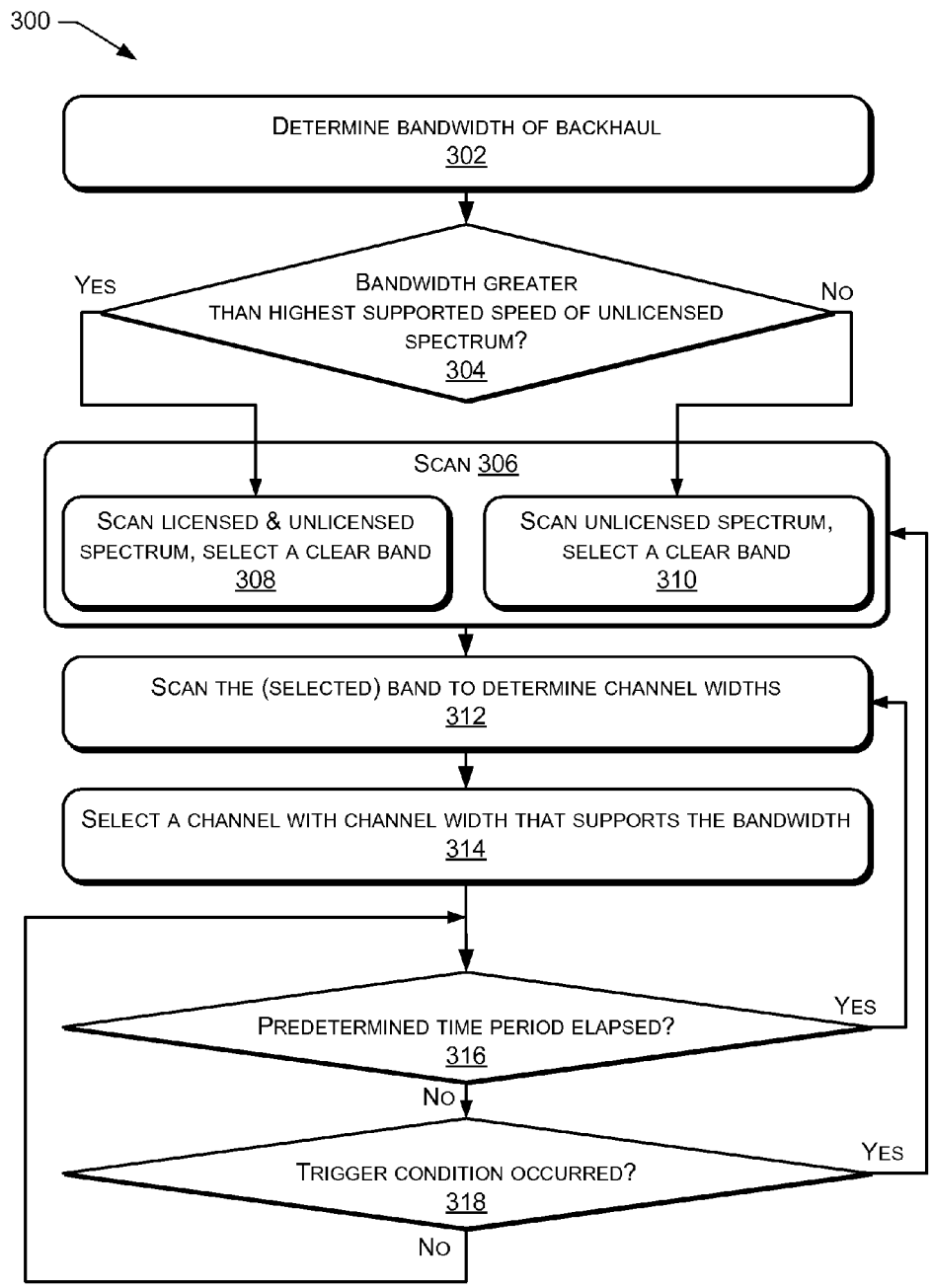
FIG. 3 is a flow diagram of an example process that includes determining a bandwidth of a backhaul according to some implementations.
Figure 4:
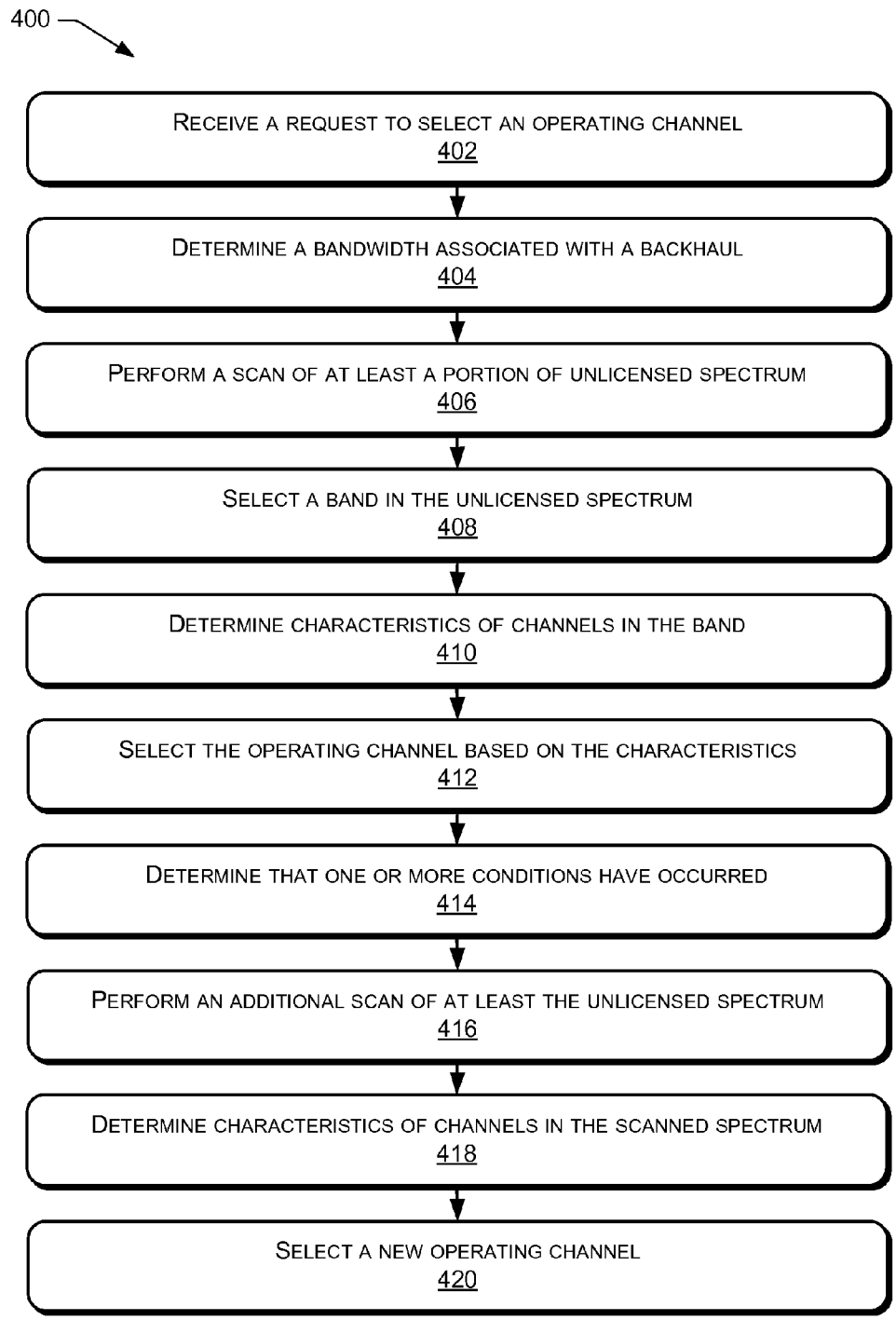
FIG. 4 is a flow diagram of an example process that includes selecting an operating channel based on channel width according to some implementations.

In the flow diagrams of FIGS. 3 and 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300 and 400 are described with reference to FIGS. 1 and 2, as described above, although other models, frameworks, systems and environments may implement these processes.

FIG. 3 is a flow diagram of an example process 300 that includes determining a bandwidth of an available backhaul according to some implementations. The process 300 may be performed by the cell 114 of FIG. 1.

At 302, an available bandwidth associated with a backhaul of a cell may be determined. For example, in FIG. 1, the cell 114 may determine the bandwidth 124 of the backhaul 120. In the case of a small cell, the bandwidth 124 may be relatively small. The cell 114 may scan channels to identify a channel that can support the bandwidth 124.

At 304, a determination is made whether the bandwidth is greater than the highest supported speed of unlicensed spectrum. If a determination is made, at 304, that ("yes") the bandwidth of the backhaul is greater than a highest supported speed of the unlicensed spectrum, then the licensed spectrum (e.g., cellular spectrum) and the unlicensed spectrum (e.g., UNII-1 and UNII-3 in the United States) may be scanned and a clearest band selected based on the scanned spectrum, at 308. If a determination is made, at 304, that ("no") the bandwidth of the backhaul is not greater than (e.g., is less than or equal to) a highest supported speed of the unlicensed spectrum, then the unlicensed spectrum (e.g., one or more of the UNII-1 or the UNII-3 spectrum) may be scanned and a clearest band selected based on the scanned spectrum, at 310. For example, in FIG. 1, if the speeds supported by bands in the unlicensed spectrum 110 are sufficient to support the bandwidth 124 of the backhaul 120, the unlicensed spectrum 110 may be scanned to identify a clearest band. If the speeds supported by bands in the unlicensed spectrum 110 are sufficient to support the bandwidth 124 of the backhaul 120, a determination may be made as to whether a particular portion of the unlicensed spectrum is the clearest, e.g., a determination may be made as to whether UNII-1 is clearer than UNII-3 or whether UNII-3 is clearer than UNII-1. If the speeds supported by bands in the unlicensed spectrum 110 are insufficient to support the bandwidth 124 of the backhaul 120, at least a portion of the licensed spectrum 108 and at least a portion of the unlicensed spectrum 110 may be scanned to identify a clearest band. The following table (Table 1) illustrates the relationship between the bandwidth of unlicensed spectrum, the bandwidth of licensed spectrum (at 10 MHz, 15 MHz, and 20 Mhz), and the peak throughput (in megabits per second (Mbps)):

TABLE 1

| Unlicensed Bandwidth (MHz) | Licensed Bandwidth (MHz) | Peak Rate (Mbps) | Licensed Bandwidth (MHz) | Peak Rate (Mbps) | Licensed Bandwidth (MHz) | Peak Rate (Mbps) |
| --- | --- | --- | --- | --- | --- | --- |
| 20 | 10 | 210 | 15 | 245 | 20 | 280 |
| 40 | 10 | 350 | 15 | 385 | 20 | 420 |
| 60 | 10 | 490 | 15 | 525 | 20 | 560 |
| 80 | 10 | 630 | 15 | 665 | 20 | 700 |
| 100 | 10 | 770 | 15 | 805 | 20 | 840 |
| 120 | 10 | 910 | 15 | 945 | 20 | 980 |
| 140 | 10 | 1050 | 15 | 1085 | 20 | 1120 |
| 160 | 10 | 1190 | 15 | 1225 | 20 | 1260 |
| 180 | 10 | 1330 | 15 | 1365 | 20 | 1400 |
| 200 | 10 | 1470 | 15 | 1505 | 20 | 1540 |
| 220 | 10 | 1610 | 15 | 1645 | 20 | 1680 |
| 240 | 10 | 1750 | 15 | 1785 | 20 | 1820 |
| 260 | 10 | 1890 | 15 | 1925 | 20 | 1960 |
| 280 | 10 | 2030 | 15 | 2065 | 20 | 2100 |
| 300 | 10 | 2170 | 15 | 2205 | 20 | 2240 |

At 312, the selected band may be scanned to determine a channel width of channels included in the selected band. At 314, a channel that has a channel width that supports the bandwidth of the backhaul may be selected. For example, in FIG. 1, the cell 114 may scan channels in the licensed spectrum 108 or in the unlicensed spectrum 110 and select a channel that has a channel width capable of supporting the bandwidth 124 of the backhaul 120.

At 316, a determination is made whether a predetermined time period has elapsed. If a determination is made, at 316, that ("yes") a trigger condition occurred, then the process 300 proceeds back to 312 where the selected band is re-scanned and a channel that can support the bandwidth is selected. Thus, a cell may periodically re-scan a selected band to identify a channel that can support the available bandwidth of the backhaul. At 316, a determination is made whether a predetermined time period has elapsed. If a determination is made, at 316, that ("no") a trigger condition did not occur, then the process 300 proceeds back to 318.

If a determination is made, at 318, that ("yes") a trigger condition occurred, then the process 300 proceeds to 306 where a scan of (i) the unlicensed spectrum or (ii) both the licensed spectrum and the unlicensed spectrum may be performed to select a clearest band. The trigger condition may include whether a signal-to-noise ratio decreased below a threshold ratio, whether an amount of interference in the selected band exceeded a threshold amount, another type of trigger condition, or any combination thereof. If a determination is made, at 316, that ("no") a trigger condition did not occur, then the process 300 proceeds to 316.

Thus, a cell may determine an available backhaul bandwidth B. If B<U (where U is the fastest speed supported by the unlicensed spectrum), then one of the bands (e.g., UNII-1 or UNII-3) in the unlicensed spectrum may be selected and scanned to identify a channel with a width sufficient to support the bandwidth of the backhaul. If B>=U, then licensed spectrum and the unlicensed spectrum (e.g., UNII-1 and UNII-3) may be scanned to identify a channel with a width sufficient to support the bandwidth of the backhaul. Spectrum may be periodically re-scanned to identify a channel with a width sufficient to support the bandwidth of the backhaul. If a trigger condition, such as a low signal-to-noise ratio or a high amount of interference occurs, the spectrum may be re-scanned to identify a channel with a width sufficient to support the bandwidth of the backhaul.

FIG. 4 is a flow diagram of an example process 400 that includes selecting an operating channel based on channel width according to some implementations. For example, the process 400 may be performed by one or more components of the cell 114 of FIG. 1.

At 402, a request to select an operating channel is received. For example, in FIG. 2, the cell 114 may receive the request 240 from the computing device 102.

At 404, a bandwidth associated with a backhaul is determined. For example, in FIG. 1, the cell 114 may determine the bandwidth 124 of the backhaul 120.

At 406, a scan of at least a portion of unlicensed spectrum is performed. At 408, a band in the unlicensed spectrum is selected. At 410, one or more characteristics of channels in the band are determined. At 412, the operating channel is selected based on the characteristics. For example, in FIG. 2, the cell 114 may scan at least a portion of the spectrum 202 and select the Mth band 218 (where M>0). The cell 114 may scan the Mth set of channels 222 in the Mth band 218 and determine one or more characteristics, such as the channel widths 236 to 238, corresponding to each of the channels 228 to 230, respectively. The operating channel 204 may be selected based on one or more of the characteristics 206. For example, the operating channel 204 may be selected because the channel width 208 is capable of supporting the bandwidth 124 of FIG. 1.

At 414, a determination is made that one or more conditions (e.g., trigger conditions) have occurred. At 416, an additional scan of at least the unlicensed spectrum is performed. At 418, characteristics of channels in the scanned spectrum are determined. At 420, a new operating channel is selected. For example, in FIG. 2, the cell 114 may re-scan the spectrum 202 after a predetermined time period has passed or if a trigger condition occurs (e.g., the SNR 210 satisfies a predetermined threshold or the interferences 212 satisfies a predetermined threshold). The cell 114 may determine characteristics (e.g., the channel widths 236 to 238) corresponding to the Mth set of channels 222, and select a new operating channel based on the characteristics.

Thus, the cell 114 may scan the spectrum 202 (e.g., one or more of the unlicensed spectrum 110 or the licensed spectrum 108 of FIG. 1) and select a band, such as the Mth band 218. The cell 114 may scan the channels 228 to 330 in the Mth band 218 and determine at least one characteristic (e.g., the channel widths 236 to 238) corresponding to each of the channels 228 to 230. The cell 114 may select the operating channel 204 based on the at least one characteristic. For example, the cell 114 may select the operating channel 204 because the channel width 208 is capable of supporting the bandwidth 124 of the backhaul 120. In this way, for small cells that have a relatively small bandwidth backhaul, a channel that supports the cell's backhaul may be selected quickly, e.g., without scanning a large portion of the spectrum 202.

Example Computing Device and Environment

Figure 5:
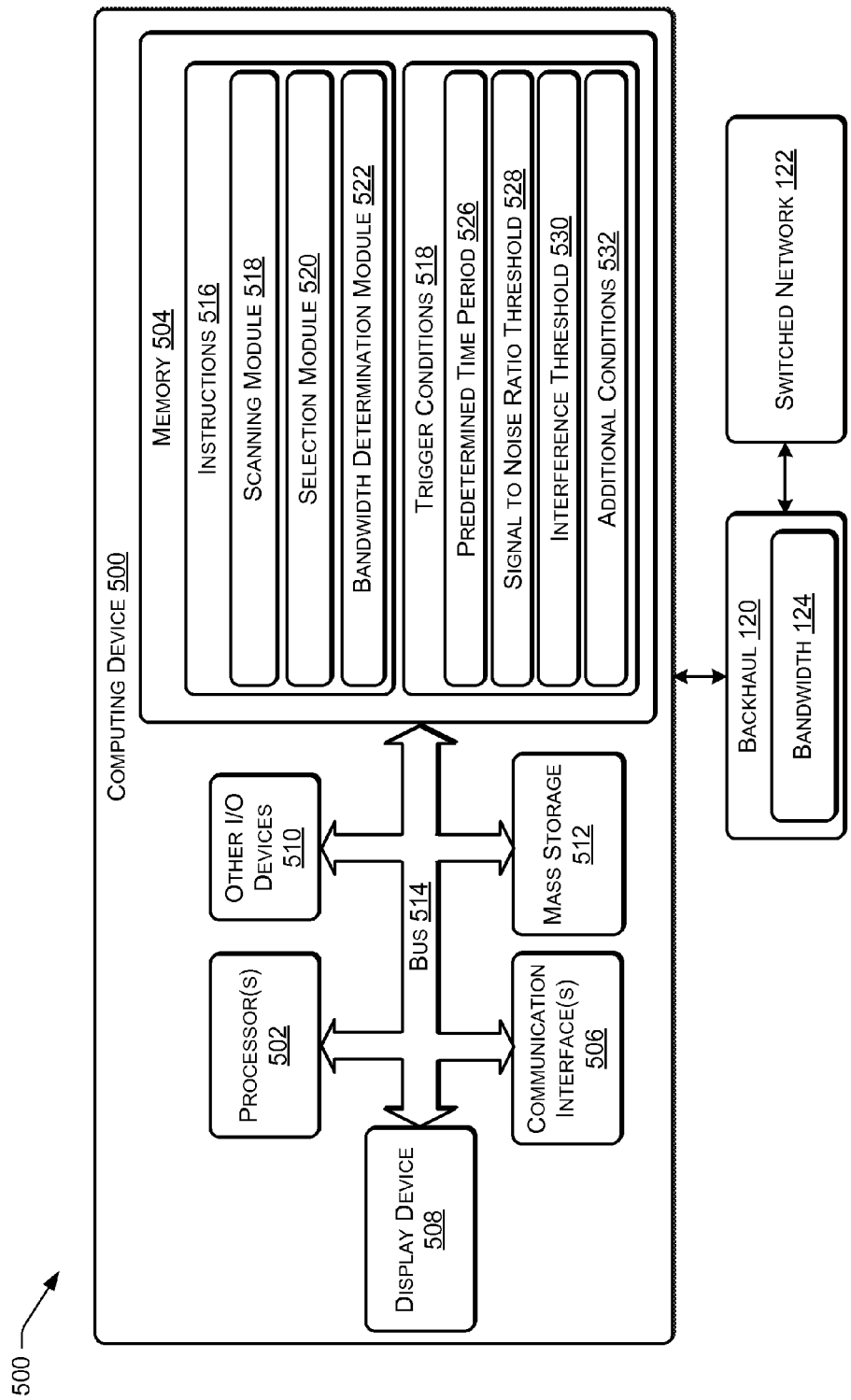
FIG. 5 is a block diagram of an example computing device and environment according to some implementations.

FIG. 5 illustrates an example configuration of a computing device 500 and environment that can be used to implement the modules and functions described herein. For example, the computing device 500 may be used to implement a component (e.g., the BTS 116 or the BSC 118) of the cell 114. The computing device 500 may include at least one processor 502, a memory 504, communication interfaces 506, a display device 508, other input/output (I/O) devices 510, and one or more mass storage devices 512, able to communicate with each other, such as via a system bus 514 or other suitable connection.

The processor 502 may be a single processing unit or a number of processing units, all of which may include single or multiple computing units or multiple cores. The processor 502 can be implemented as one or more microprocessors, microcomputers, microcontrollers, digital signal processors, central processing units, state machines, logic circuitries, and/or any devices that manipulate signals based on operational instructions. Among other capabilities, the processor 502 can be configured to fetch and execute computer-readable instructions stored in the memory 504, mass storage devices 512, or other computer-readable media.

Memory 504 and mass storage devices 512 are examples of non-transitory computer storage media for storing instructions which are executed by the processor 502 to perform the various functions described above. For example, memory 504 may generally include both volatile memory and non-volatile memory (e.g., RAM, ROM, or the like). Further, mass storage devices 512 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein, and may be a non-transitory media capable of storing computer-readable, processor-executable program instructions as computer program code that can be executed by the processor 502 as a particular machine configured for carrying out the operations and functions described in the implementations herein.

The computing device 500 may also include one or more communication interfaces 506 (e.g., an air interface) for exchanging data with other devices, such as via a network, direct connection, or the like, as discussed above. The communication interfaces 506 can facilitate communications within a wide variety of networks and protocol types, including wired networks (e.g., LAN, cable, etc.) and wireless networks (e.g., WLAN, cellular, satellite, etc.), the Internet, LAA/LTE-U, and the like. Communication interfaces 506 can also provide communication with external storage (not shown), such as in a storage array, network attached storage, storage area network, or the like.

A display device 508, such as a monitor may be included in some implementations for displaying information and images to users. Other I/O devices 910 may be devices that receive various inputs from a user and provide various outputs to the user, and may include a keyboard, a remote controller, a mouse, a printer, audio input/output devices, and so forth.

Memory 504 may include modules and components for selecting an operating channel according to the implementations herein. In the illustrated example, memory 504 includes instructions 516 and trigger conditions 518. The instructions 516 may be executed by the one or more processors 502 to perform the various techniques described herein. For example, a scanning module 518 may scan a spectrum to identify a band and then scan channels in the band to determine characteristics of each channel in the band. A selection module 520 may identify a clearest band from among multiple bands and select a channel from among multiple channels based on one or more characteristics. A bandwidth determination module 522 may determine a bandwidth of a backhaul. Of course, the instructions 516 may include other types of software, such as an operating system, device drivers, and other modules to perform other types of functions.

The trigger conditions 518 may include conditions that when satisfied, cause a cell (e.g., the cell 114 of FIG. 1) to re-scan the spectrum to select a new operating channel. For example, the spectrum may be re-scanned and a new operating channel selected after a predetermined time period 526 has elapsed. The spectrum may be re-scanned and a new operating channel selected when a signal to noise ratio of the operating channel satisfies (e.g., falls below) a signal to noise ratio threshold 528. The spectrum may be re-scanned and a new operating channel selected when an amount of interference in the operating channel satisfies (e.g., is greater than) an interference threshold 530. The spectrum may be re-scanned and a new operating channel selected when one or more additional conditions 532 are satisfied.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by one or more processors configured with specific instructions, the method comprising:
   receiving, by a base station, a request to select an operating channel for a computing device;
   determining, by the base station, a bandwidth associated with a backhaul that carries communications between the base station and a network;
   performing, by the base station, a scan of at least a portion of an unlicensed spectrum;
   selecting, by the base station, a band in the unlicensed spectrum based at least partly on the scan;
   determining, by the base station, a set of channel widths, wherein individual channel widths of the set of channel widths correspond to individual channels of a set of channels in the band; and
   selecting, by the base station, the operating channel from the set of channels in the band based at least partly on a channel width of the operating channel, wherein the channel width of the operating channel supports the bandwidth associated with the backhaul.

2. The method of claim 1, the method further comprising:
   performing an additional scan of at least a portion of a licensed spectrum; and
   determining at least one additional channel width of at least one additional channel in the licensed spectrum.

3. The method of claim 2, wherein selecting the operating channel further comprises:
   selecting the operating channel from the set of channels and the at least one additional channel.

4. The method of claim 1, wherein the unlicensed spectrum comprises at least one of:
   5.15 GigaHertz (GHz) to 5.25 GHz; or
   5.725 GHz to 5.825 GHz.

5. The method of claim 1, further comprising:
   after a predetermined period of time, re-scanning the band to determine the set of channel widths; and
   selecting a new operating channel from the set of channels in the band based at least partly on the set of channel widths.

6. The method of claim 1, further comprising:
   determining that a characteristic associated with the operating channel has fallen below a predetermined threshold; and
   selecting a different operating channel.

7. The method of claim 6, wherein selecting the different operating channel comprises:
   performing a second scan of at least the unlicensed spectrum;

selecting a second band in the unlicensed spectrum based at least partly on the second scan;

determining a second set of channel widths, wherein individual ones of the second set of channel widths correspond to individual channels in a second set of channels associated with the second band; and selecting a new operating channel from the second set of channels associated with the second band based at least partly on the second set of channel widths.

8. One or more non-transitory computer readable media storing instructions that are executable by one or more processors to perform operations comprising:

receiving a request to select an operating channel;

determining a bandwidth associated with a backhaul carrying communications traffic between a base station and a network;

performing a scan of at least a portion of an unlicensed spectrum;

selecting a band in the unlicensed spectrum based at least partly on a transmission clarity associated with the band; and selecting an operating channel from a set of channels in the band based at least partly on a channel width of the operating channel.

9. The one or more non-transitory computer readable media of claim 8, wherein selecting the operating channel from the set of channels in the band comprises:

determining that the channel width of a particular channel from the set of channels supports the bandwidth associated with the backhaul; and selecting the particular channel as the operating channel.

10. The one or more non-transitory computer readable media of claim 8, wherein the operations further comprise:

determining a set of channel widths, wherein individual channel widths of the set of channel widths correspond to individual channels of the set of channels in the band in the unlicensed spectrum.

11. The one or more non-transitory computer readable media of claim 10, wherein the operations further comprise:

selecting a new operating channel from the set of channels in the band based at least partly on the set of channel widths.

12. The one or more non-transitory computer readable media of claim 8, wherein the operations further comprise:

selecting a different operating channel based at least in part on determining that a signal to noise ratio associated with the operating channel satisfies a predetermined threshold.

13. The one or more non-transitory computer readable media of claim 8, wherein the operations further comprise:

selecting a different operating channel based at least in part on determining that an amount of interference associated with the operating channel satisfies a predetermined threshold.

14. A base station, comprising:

one or more processors; and one or more computer readable media to store instructions that are executable by the one or more processors to perform operations comprising:

receiving a request from a computing device to select an operating channel;

determining a bandwidth associated with a backhaul connecting the base station to a network;

selecting a band in an unlicensed spectrum based at least partly on a scan of at least a portion of the unlicensed spectrum; and selecting an operating channel in the band based at least partly on determining that a channel width of the operating channel supports the bandwidth associated with the backhaul.

15. The base station of claim 14, wherein the operations further comprise:

determining a channel width of at least one channel in the band in the unlicensed spectrum.

16. The base station of claim 15, wherein the operations further comprise:

selecting a new operating channel in the band based at least partly on the channel width.

17. The base station of claim 14, wherein the operations further comprise:

determining that a characteristic associated with the operating channel satisfies a predetermined threshold; and selecting a second operating channel to replace the operating channel.

18. The base station of claim 17, wherein the characteristic comprises at least one of:

a signal to noise ratio associated with the operating channel; or an amount of interference associated with the operating channel.

19. The base station of claim 17, wherein selecting the second operating channel comprises:

selecting a second band in the unlicensed spectrum or a licensed spectrum based at least partly on a second scan of at least a portion of the unlicensed spectrum and the licensed spectrum; and selecting the second operating channel based at least partly on a second channel width associated with the second operating channel.

20. The base station of claim 14, wherein the unlicensed spectrum includes at least a portion of spectrum between 5.15 GigaHertz (GHz) and 5.825 GHz.

* * * * *